(12) United States Patent
Cheng et al.

(10) Patent No.: US 10,939,447 B2
(45) Date of Patent: Mar. 2, 2021

(54) POLICY-BASED CONTROL OF RELIABILITY REQUEST FOR EV2X

(71) Applicant: QUALCOMM Incorporated, San Diego, CA (US)

(72) Inventors: Hong Cheng, Bridgewater, NJ (US); Zhibin Wu, Bedminster, NJ (US); Michaela Vanderveen, Tracy, CA (US); Sudhir Kumar Baghel, Hillsborough, NJ (US); Kapil Gulati, Dover, DE (US)

(73) Assignee: Qualcomm Incorporated, San Diego, CA (US)

(*) Notice: Subject to any disclaimer, the term of this patent is extended or adjusted under 35 U.S.C. 154(b) by 7 days.

(21) Appl. No.: 16/195,632

(22) Filed: Nov. 19, 2018

(65) Prior Publication Data

US 2019/0230645 A1    Jul. 25, 2019

Related U.S. Application Data

(60) Provisional application No. 62/620,163, filed on Jan. 22, 2018.

(51) Int. Cl.
*H04W 4/70* (2018.01)
*H04W 4/40* (2018.01)
(Continued)

(52) U.S. Cl.
CPC .......... *H04W 72/048* (2013.01); *H04L 45/24* (2013.01); *H04W 4/40* (2018.02); *H04W 4/70* (2018.02);
(Continued)

(58) Field of Classification Search
None
See application file for complete search history.

(56) References Cited

U.S. PATENT DOCUMENTS

| 2017/0288886 | A1 | 10/2017 | Atarius et al. | |
| 2018/0124656 | A1* | 5/2018 | Park | H04W 36/0022 |
| 2019/0110175 | A1* | 4/2019 | Chun | H04W 4/40 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 15)", 3GPP Standard; Technical Specification; 3GPP TS 24.301, 3rd Generation Partnership Project (3GPP), Mobile Competence Centre ; 650, Route Des Lucioles ; F-06921 Sophia-Antipolis Cedex; France, vol. CT WG1, No. V15.1.1, Jan. 8, 2018 (Jan. 8, 2018), pp. 1-507, XP051392414, [retrieved on Jan. 8, 2018], p. 276-p. 285.

(Continued)

*Primary Examiner* — Ajit Patel
(74) *Attorney, Agent, or Firm* — Arent Fox, LLP

(57) ABSTRACT

A method, apparatus, and computer-readable medium for transmission control include receiving, at a non-access stratum protocol layer, a packet including a reliability request from an application, and determining if the application is authorized to make the reliability request. Further, the aspects include, in response to determining the application is authorized to make the reliability request, performing one of: sending the packet including the reliability request to an access stratum protocol layer, or sending the packet with a modified reliability request to the second protocol layer. Additionally, the aspects include transmitting the packet. Further aspects describe a control plane delivery mechanism for provisioning UE, such as with policies and/or configurations including transmission control reliability authorization information.

30 Claims, 10 Drawing Sheets

(51) Int. Cl.
*H04W 72/04* (2009.01)
*H04W 12/08* (2021.01)
*H04W 12/06* (2021.01)
*H04L 12/707* (2013.01)
*H04W 72/08* (2009.01)

(52) U.S. Cl.
CPC .......... *H04W 12/06* (2013.01); *H04W 12/08* (2013.01); *H04W 72/087* (2013.01)

(56) References Cited

OTHER PUBLICATIONS

"3rd Generation Partnership Project; Technical Specification Group Services and System Aspects; System Architecture for the 5G System; Stage 2 (Release 15)", 3GPP Standard; Technical Specification; 3GPP TS 23.501, 3rd Generation Partnership Project (3GPP), Mobile Competence Centre 650, Route Des Lucioles; F-06921 Sophia-Antipolis Cedex; France, vol. SA WG2, No. V15.0.0, Dec. 22, 2017 (Dec. 22, 2017), XP051392101, pp. 1-181 p. 46, p. 50-p. 54, p. 81-p. 97.
International Search Report and Written Opinion—PCT/US2018/064741—ISA/EPO—dated Jun. 25, 2019.

\* cited by examiner

POLICY-BASED CONTROL OF RELIABILITY REQUEST FOR EV2X

CROSS-REFERENCE TO RELATED APPLICATION

The present application claims priority to U.S. Provisional Application No. 62/620,163, entitled "Policy Based-Control of Reliability Request for eV2X," filed on Jan. 22, 2018, the content of which is incorporated by reference in its entirety.

BACKGROUND

The present disclosure relates to wireless communications, and more particularly, to apparatus and methods of policy-based control of a packet transmission reliability request in an enhanced vehicle-to-everything (eV2X) wireless communication network.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access networks include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include enhanced mobile broadband addressing human-centric use cases for access to multimedia content, services and data; ultra-reliable-low latency communications (URLLC) with certain specifications for latency and reliability; and massive machine type communications, which may allow a very large number of connected devices, and transmission of a relatively low volume of non-delay-sensitive information. As the demand for mobile broadband access continues to increase, however, further improvements in NR communications technology and beyond may be desired.

In 5G communications within vehicle-to-everything (V2X) platforms, a user equipment (UE) may want to control transmission priorities relating to packets sent and received by the applications, such as V2X applications. However, further controls may be desired, but should be carefully managed, as such transmission control directly impacts radio resources allocations. Therefore, improvements in the management of transmission control may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, a method, apparatus, and computer-readable medium for transmission control include receiving, at a non-access stratum protocol layer, a packet including a reliability request from an application, and determining if the application is authorized to make the reliability request. Further, the aspects include, in response to determining the application is authorized to make the reliability request, performing one of: sending the packet including the reliability request to an access stratum protocol layer, or sending the packet with a modified reliability request to a second protocol layer. Additionally, the aspects include transmitting the packet.

In other aspects, a method, apparatus, and computer-readable medium for configuring a user equipment includes establishing, at a core network element, a control plane communication session with the user equipment, and identifying a vehicle-to-everything (V2X) service associated with the user equipment, wherein the V2X service has V2X configuration information for the user equipment. Further, the aspects include forwarding a request for the V2X configuration to a core network-based V2X control function, and receiving the V2X configuration from the V2X control function in response to the request. Additionally, the aspects include sending the V2X configuration to the user equipment via the control plane communication session.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
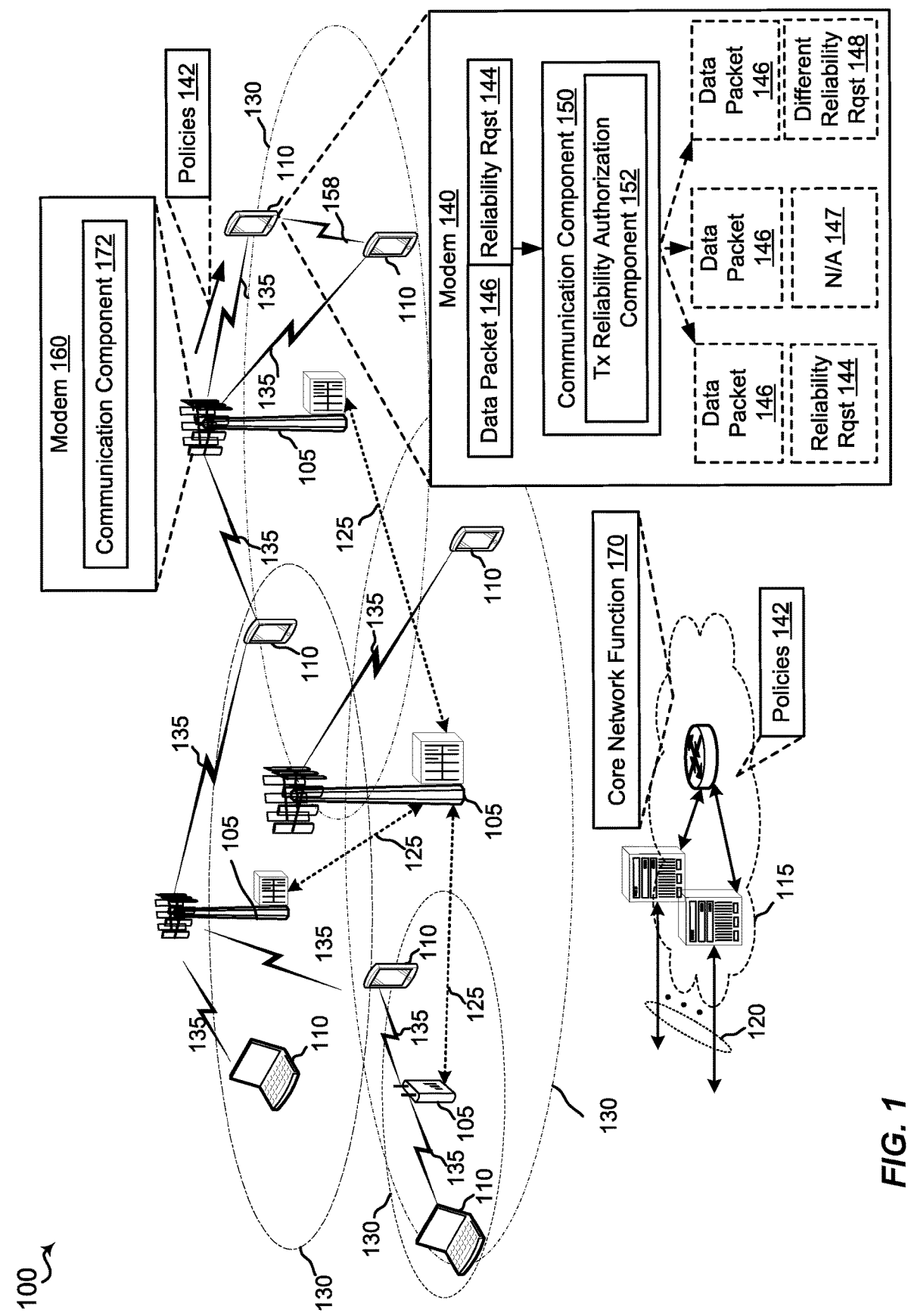
FIG. 1 is a schematic diagram of an example of a wireless communication network including at least one user equipment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

During operation within a mobile network, a UE may use policies obtained from the network to determine whether and/or to what level applications are authorized to control transmission reliability of data packets. In some implementations, an application on a UE may send a packet with a reliability request from a first protocol layer to a relatively lower, second protocol layer. The reliability request may have one of a plurality of values that each correspond to a different level of reliability and/or to a particular reliability-related transmission feature, such as packet duplication, transmission diversity, or carrier aggregation. For instance, with a UE having a V2X communication service, the application may be a V2X application that may send the packet and reliability request from an application protocol layer to a non-access stratum (NAS) protocol layer, such as a V2X NAS protocol layer.

Functionality described herein associated with the second protocol layer within the UE may use the policies, including identification of authorized and/or unauthorized V2X applications for requesting data packet priorities, and/or authorized priority level(s) of authorized V2X application(s), to determine whether or not the application is authorized to make the reliability request and/or if a level of the requested priority is authorized.

If the second protocol layer determines that the application is authorized, the second protocol layer may relay the packet with the reliability request to a relatively lower, third protocol layer. For instance, the third protocol layer may include one or more of an access stratum (AS), a V2X AS, a packet data convergence protocol (PDCP), a radio link control (RLC), a medium access control (MAC), and/or a physical (PHY) protocol layer.

If the second protocol layer determines that the application is not authorized, the second protocol layer may relay the packet to the third protocol layer without the reliability request, or may relay the packet to the third protocol layer with a modified reliability request having an authorized priority level (as opposed to the requested, unauthorized priority level).

The third protocol layer may then schedule and/or otherwise manage transmission resources and transmit the packet based on the reliability request, if any, received with the packet. Optionally, in some cases, a priority request may be received along with the packet. In these cases, the third protocol layer may then schedule and/or otherwise manage transmission resources and transmit the packet based on two dimensions, e.g., the reliability request and the priority associated with the received packet.

Thus, in an aspect, the present disclosure provides a mechanism to configure the UE with policies regarding, at least, the V2X applications such that the V2X NAS protocol layer can authorize a reliability request before sending the packet and the reliability request to the AS protocol layer, thereby improving control over the use of transmission resources.

Moreover, in an additional or alternative aspect, the present disclosure provides a control plane delivery mechanism to provide the UE with policy information when the UE is connected via a 5G NR access network. This policy information may be based on services requested by or provided to the UE, such as one or more network slices, where each slice is defined by a collection of logical network functions and parameter configurations tailored to support the requirements of a particular service. The policy information may include the policies that identify authorized and/or unauthorized V2X applications for requesting data packet priorities, and/or an authorized priority level(s) of authorized V2X applications, or any other policy or configuration information associated with any other services for which the UE may register. The control plane mechanism can be implemented by a core network-based access and mobility management function (AMF) that obtains policies, for example, from a V2X control function either upon UE registration, e.g., when a V2X slice is selected, or in response to a UE request for a V2X configuration after registration. Alternatively, the V2X policies may be provisioned to the UE in a configuration delivered to the UE by a core network-based policy control function (PCF), e.g., as part of the policy framework, and also further considering the V2X slice of the UE.

Therefore, by implementing one or more of the present solutions, the UE may be able to prevent radio resources being wasted on applications that are not supposed to be used on more than single channel transmissions. Also, due to the use of the control plane configuration, the UE may obtain the configuration more reliably and does not need to establish user plane connections.

Referring to FIG. 1, in accordance with various aspects of the present disclosure, the wireless communication network 100 may include one or more base stations 105, one or more UEs 110, and a core network 115. The core network 115 may be a 4G core, a 5G core, or other suitable core networks. Examples of a 5G core are discussed below with reference to FIGS. 4-6. The UE 110 may be preconfigured with one or more policies 142, or may be configured with one or more policies 142 from the core network 115 via the BS 105. The policies 142 include, at least, information authorizing one or more applications within the UE 110 to make reliability requests 144 relating to transmission of data packets 146 generated by the one or more applications on UE 110. For instance, the one or more applications may be V2X applications, and the policies 142 may include identification of V2X applications authorized and/or not authorized to make reliability request 144, and, optionally, also identification of an authorized level of reliability request 144 for those V2X applications that are authorized. Further, for example, each reliability request 144 may include a value indicating a requested transmission reliability or reliability-related transmission feature, such as but not limited to packet duplication, transmission diversity, or carrier aggregation.

For example, the UE 110 may utilize a communications component 150 of a modem 140 to establish communication protocol layers and transport a data packet 146 and associated reliability request 144, generated by an application, from an application protocol layer to one or more lower protocol layers to be scheduled for transmission. Next, the UE 110 may use a transmission reliability authorization component 152, operating at non-access stratum protocol layer below the application protocol layer, to determine whether reliability request 144 associated with received data packet 146 may be granted based on the one or more policies 142 provisioned from core network 115. If the reliability request 144 is granted, the communication component 150 may send data packet 146, along with reliability request 144, to other lower protocol layers, e.g., access stratum layers, within the UE 110 for scheduling and then for transmission. If reliability request 144 is denied due to insufficient authorization, the communication component 150 may send data packet 146 with no reliability request 147 or with a different reliability request 148 (e.g., a lower, authorized level of reliability) to the other lower layers. Communication component 150 may thus control a transmission priority used to schedule data packet 146 based on policy 142 received from core network 115.

Further, in other aspects, the user equipment 110 may be provisioned with policy 142 utilizing one or more control plane delivery mechanisms implemented by one or more core network functions 170 at core network 115. Policy 142 may be based on services requested by or provided to UE 110, such as one or more network service slices, where each slice is defined by a collection of logical network functions and parameter configurations tailored to support the requirements of a particular service. As such, in one implementation, the control plane delivery mechanism can be implemented by core network function 170 such as an access and mobility management function (AMF), which may obtain policy 142, for example V2X authorization information relating to transmission reliability requested by V2X applications, from a core network-based V2X control function. AMF may obtain policy 142 either upon registration of UE 110, e.g., when a V2X slice is selected, or in response to a configuration request for a V2X service received from UE 110 after registration. Alternatively, policy 142 such as the V2X policies may be provisioned to UE 110 in a configuration delivered to UE 110 by core network function 170 such as a policy control function (PCF), e.g., as part of the policy framework, and also further considering the V2X slice of the UE. For example, after the AMF or the PCF receives the requested policy 142 from the V2X control function, a communication component 172 of a modem 160 of BS 105 may transmit the requested policy 142 back to the UE 110 via a control plane communication session to complete the policy provisioning process.

The modem 160 of base station 105 may be configured to communicate with other base stations 105 and UEs 110 via a cellular network or other wireless and wired networks. The modem 140 of UE 110 may be configured to communicate via a cellular network, a Wi-Fi network, or other wireless and wired networks. The modems 140, 160 may receive and transmit data packets, via transceivers.

The core network 115 may provide user authentication, access authorization, tracking, internet protocol (IP) connectivity, and other access, routing, or mobility functions. The base stations 105 may interface with the core network 115 (e.g., 4G core or 5G core) through backhaul links 120 (e.g., S1, etc.). The base stations 105 may perform radio configuration and scheduling for communication with the UEs 110, or may operate under the control of a base station controller (not shown). In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. In various examples, the base stations 105 may communicate, either directly or indirectly (e.g., through core network 115), with one another over backhaul links 125 (e.g., X1, etc.), which may be wired or wireless communication links.

In a non-limiting example, the core network 115 (e.g., 4G core) may include one or more Mobility Management Entity (MME), a Serving Gateway, a Multimedia Broadcast Multicast Service (MBMS) Gateway, a Broadcast Multicast Service Center (BM-SC), and a Packet Data Network (PDN) Gateway. The MME may be in communication with a Home Subscriber Server (HSS). The MME is the control node that processes the signaling between the UEs 110 and the core network 115. Generally, the MME provides bearer and connection management. All user Internet protocol (IP) packets are transferred through the Serving Gateway, which itself is connected to the PDN Gateway. The PDN Gateway provides UE IP address allocation as well as other functions. The PDN Gateway and the BM-SC are connected to the IP Services. The IP Services may include the Internet, an intranet, an IP Multimedia Subsystem (IMS), a PS Streaming Service, and/or other IP services. The BM-SC may provide functions for MBMS user service provisioning and delivery. The BM-SC may serve as an entry point for content provider MBMS transmission, may be used to authorize and initiate MBMS Bearer Services within a public land mobile network (PLMN), and may be used to schedule MBMS transmissions. The MBMS Gateway may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell. A network that includes both small cell and macro cells may be known as a heterogeneous network. A heterogeneous network may also include Home Evolved Node Bs (eNBs) (HeNBs), which may provide service to a restricted group known as a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

Small cells may operate in a licensed and/or an unlicensed frequency spectrum. When operating in an unlicensed frequency spectrum, the small cell may employ NR and use the same 5 GHz unlicensed frequency spectrum as used by the Wi-Fi access point. The small cell, employing NR in an unlicensed frequency spectrum, may boost coverage to and/or increase capacity of the access network.

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. Other examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be able to communicate with various types of base stations 105 and network equipment including macro eNBs, small cell eNBs, macro gNBs, small cell gNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The uplink may be referred to as a reverse link, and the downlink may be referred to as a forward link. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The communication links 135 may use multiple-input and multiple-output (MIMO) antenna technology, including spatial multiplexing, beamforming, and/or transmit diversity. The communication links may be through one or more carriers. The base stations 105/UEs 110 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell and a secondary component carrier may be referred to as a secondary cell.

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

A base station 105, whether a small cell 105' or a large cell (e.g., macro base station), may include an eNB, gNodeB (gNB), or other type of base station. Some base stations 105, such as a gNB may operate in a traditional sub 6 GHz spectrum, in millimeter wave (mmW) frequencies and/or near mmW frequencies in communication with the UE 110. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 105 provides an access point to the 4G core or the 5G core for a UE 110.

Figure 2:
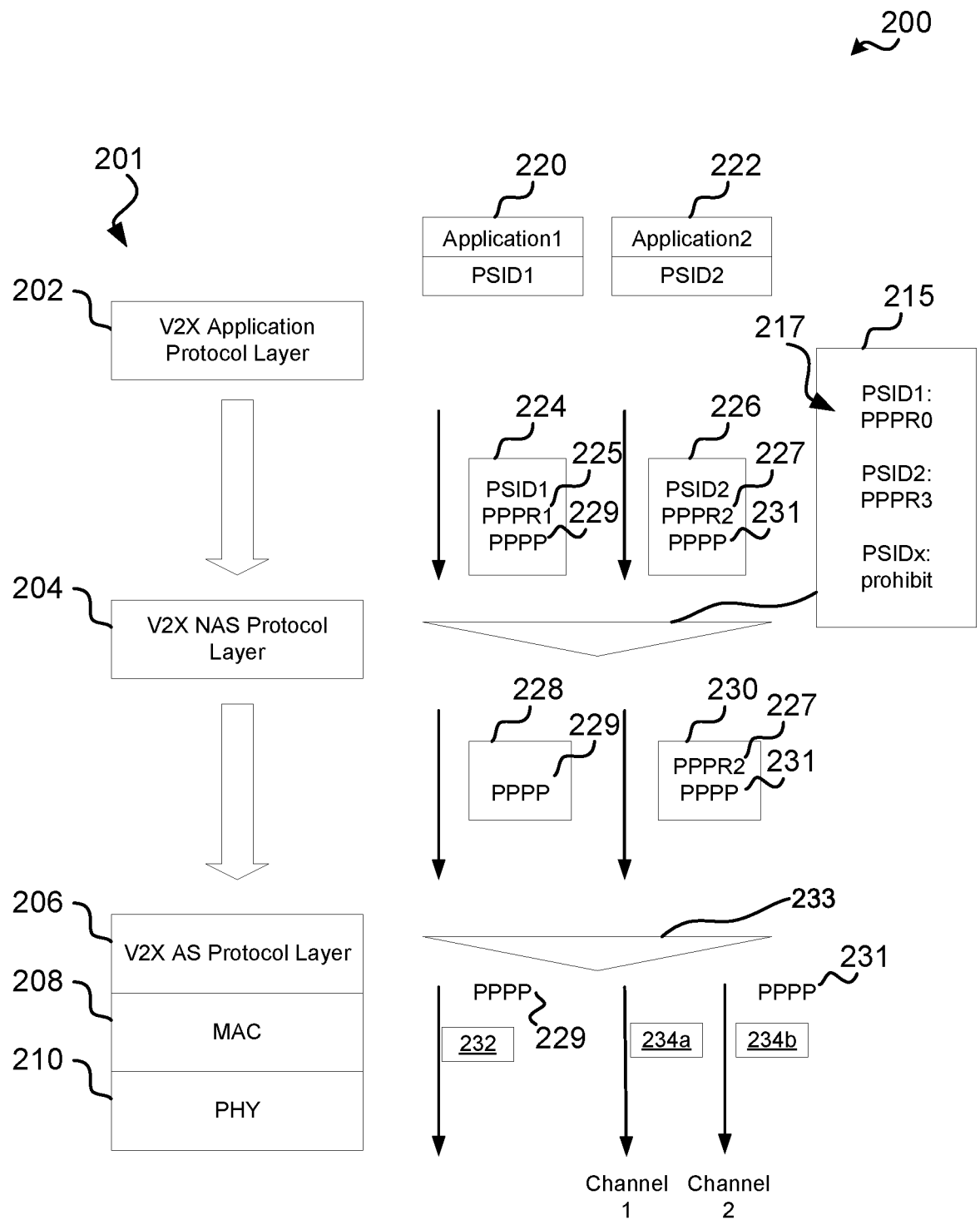
FIG. 2 is a schematic diagram of an example of a data packet generated by an application and being processed through a protocol stack of a user equipment, including applying policy-based transmission control over a reliability request associated with the data packet.

Referring to FIG. 2, a policy-based transmission control process 200 includes one or more applications, e.g., Application1 220 and Application2 222, respectively generating data packets 224, 226 and associated reliability requests 225, 227, and a protocol stack 201 of the UE 110 (not shown) enforcing one or more policies 215 relative to the reliability requests 225, 227 to control use of resources in transmitting the data packets 224, 226. In this example, it should be noted that data packets 224, 226 and respective reliability requests 225, 227 may be similar to data packet 146 and corresponding reliability request 144 described in FIG. 1, and that policy 215 may be the same as or similar to policy 142 of FIG. 1.

In an implementation, the one or more applications 220, 222 may be V2X applications, and the one or more policies 215 may include may include identification of V2X applications authorized and/or not authorized to make a reliability request, and, optionally, identification of an authorized level of reliability request for those V2X applications that are authorized. For example, the policies 215 may include one or more sets of authorization information 217 including one or more authorized or not authorized provider service identifiers (PSID), which identify a corresponding one or more applications, and, optionally, one or more authorized reliability request levels for each authorized PSID. Further, for example, the authorized reliability requests may be in the form of a ProSe Per Packet Reliability (PPPR), which indicates whether the corresponding PDID (and, hence, application) is authorized to request a data packet transmission reliability, and, which optionally indicate one or more of a plurality of levels of transmission reliability that are authorized to be requested. In an example implementation, for instance, PSID1 may represent an identifier corresponding to Application1 220. Further, PPPR0 may represent the authorized reliability that may be requested by PSID1, where the value "0" may represent an authorized level of reliability. Similarly, PSID2 may identify Application2 222, and may have a corresponding authorized reliability of PPPR3, where the value "3" may represent the authorized level of reliability. It should be understood that the values "0" and "3" are examples of different levels, and the level of authorized reliability may be any value representing one or more of a plurality of levels of authorized reliability. For instance, in some cases, the plurality of levels of reliability may be hierarchical or prioritized from high to low, or from low to high, such that indicating a given level may inherently indicate lower hierarchical or lower priority levels, too. Further, for example, the plurality of levels of reliability may, in some implementations, be a bit value that indicates 8 levels of reliability (e.g., from "0" to "7"), or two or more levels of reliability (e.g., "low" or "high," or "low," "medium," "high," etc.). Further, for example, policy 215 may include authorized PSIDs (e.g., PSIDs having corresponding PPPRs) and not authorized PSIDs (e.g., PSIDs explicitly not authorized, such as indicated by "PSIDx: prohibit") in a single list or table, or separately such as in a white list and a black list, respectively. Additionally, in some implementations, Application1 220 and Application2 222 may include a respective priority request 229, 231 in packets 224, 226 along with the respective reliability requests 225, 227 to provide two dimensions of quality of service (QoS) in packet transmission control. For example, the priority request 229, 231 may be in the form of a ProSe Per Packet Priority (PPPP), which indicates an order of transmission for respective packet.

In operation, Application1 220 and Application2 222 may send packets 224, 226 to the protocol stack 201 for transmission. The protocol stack 201 may include a plurality of protocol layers that apply layer-specific protocol rules to the packets 224, 226 to enable their transmission over a network. For example, the protocol stack 201 may include a plurality of hierarchical layers, including in this example a V2X application protocol layer 202 that lies above or is higher than a V2X non-access stratum (NAS) protocol layer 204, which lies above or is higher than one or more access stratum (AS) protocol layers, such as a V2X AS protocol layer 206, a medium access control (MAC) protocol layer 208, and a physical (PHY) protocol layer 210. The packet 224 may include PSID1, PPPR1 225 and, optionally, PPPP 229, and the packet 226 may include PSID2, PPPR2 227, and, optionally, PPPP 231.

V2X application protocol layer 202 sends the packets 224, 226 to V2X NAS protocol layer 204, which may determine, based on authentication information 217 in policy 215, that Application1 220 corresponding to PSID1 does not have sufficient authorization to make the reliability request of PPPR1 225 because authentication information 217 indicates its highest request level is 0 (e.g., PPPR0). Further, V2X NAS protocol layer 204 may determine, also based on authentication information 217 in policy 215, that Application2 222 corresponding to PSID2 has sufficient authorization to make the reliability request of PPPR2 227 because authentication information 217 indicates its highest request level is 3, which is higher than the requested reliability level of 2. After the authorization process, V2X NAS protocol layer 204 modifies the packets 224, 226 into NAS layer packet data units (PDUs) 228, 230 and sends the PDUs 228, 230 to V2X AS protocol layer 206. In this example, the PDU 228 containing data packet 224 no longer has the reliability request PPPR1 225, e.g., the reliability request has been removed, but the PDU 230 containing data packet 226 maintains the reliability request PPPR2 227. Moreover, in some implementations, each PDU 228, 230 may maintain the respective PPPP 229, 231 corresponding to each data packet 224, 226.

Next, the AS protocol layers, e.g., V2X AS protocol layer 206, MAC protocol layer 208, and PHY protocol layer 210, respectively modifies the PDUs 228, 230 according to any attached reliability request, e.g., PPPR2 227 of PDU 230, and optionally based on any attached transmission priorities, e.g., PPPP 229, 231. As a result, data packet 224 is transmitted in PDU 232, optionally according to PPPP 229, and data packet 226 is transmitted, in this case, in duplicate PDUs 234a and 234b over different channels (Channel 1 and Channel 2, respectively) based on PPPR2 227, and optionally according to PPPP 231. In general, it should be understood that AS protocol layers may apply one or more transmission features 233 to any received PDU based on a corresponding level of PPPR. In some implementations, the reliability requests 225, 227 may indicate or be associated with a respective transmission feature 233, such as but not limited to, a packet duplication request, a transmission diversity request, or a carrier aggregation request.

Additionally, it should be noted that in other scenarios, such as where at least one of reliability requests 225, 227 exceeds an authorized level but where the corresponding application is authorized for a lower level of reliability, the AS protocol layers may modify the respective reliability request 225, 227 to reduce the requested reliability to the authorized level. As such, one or both of PDUs 228, 230 may include a modified reliability request, e.g., relative to the originally-requested reliability requests 225, 227, e.g., have a different (lower) level of requested reliability.

Thus, in summary, in some implementations, quality of service (QoS) for V2X transmissions may be based on one or both of a PPPR and a PPPP. The use of PPPR allows the Access Stratum (AS) protocol layers (e.g. PDCP/RLC/MAC/PHY) to exercise further control over transmission resources used in transmitting data packets generated by V2X applications. This PPPR parameter may be used by the AS layer for deciding transmission/reception operations, e.g. packet duplication over different channels, or even other features such as transmission diversity, carrier aggregation, etc. This new parameter PPPR may be requested by the application layer, similar to that of the PPPP, and would be passed down by V2X layer towards AS layer. Since PPPR controls how the radio resources are to be utilized (e.g. Packet Duplication would use much more radio resources than normal transmission), not every application should be allowed to trigger it.

Accordingly, the present disclosure provides policy-based control of the reliability request from V2X application, including a control plane mechanism to configure the UE 110 with policies regarding the V2X applications. For example, the UE 110 may be preconfigured with policy 215 stored in a memory of the UE 110, or the control strategy may utilize the control plane delivery mechanism to provide the UE 110 with policy information when UE is connected to a wireless network, e.g., a 5G NR network. Consequently, based on the received information in policy 215, the V2X layer can authorize the reliability request (e.g., PPPR) before sending it to the AS layer, which influences the radio resources use.

In a non-limiting example, the UE 110 is configured with policy 215 that includes one or more sets of authentication information 217, such as a PPPR authorization list. The PPPR authorization list can be preconfigured and stored on the UE 110, a universal integrated-circuit card (UICC) of the UE 110, or provisioned from the core network 115, such as a 4G core or a 5G core, (e.g., via control plane communications). This list may specify which PSID can request which level of reliability, or could be a blacklist, i.e. which PSID is not authorized to request PPPR. When an application sends the packet to the protocol stack, it includes the PPPR with the packet. The V2X layer checks the PPPR authorization list and decide if the request PPPR is authorized. V2X layer can decide whether or not to forward the PPPR with the packet to the AS layer. Alternatively, the V2X layer can modify the requested reliability, e.g., in a case where a requested PPPR is higher than an authorized level of PPPR, by forwarding the packet with a modified PPPR indicating the highest allowed PPPR level to AS layer. Based on the PPPR, the AS layer decides whether or not to use certain AS layer features, such as transmission diversity, carrier aggregation, and packet duplication. In addition, in case of the V2X Application is a legacy application and does not provide PPPR with the packet, the V2X layer may provide a default PPPR value associated with the packet to the AS layer.

Figure 3:
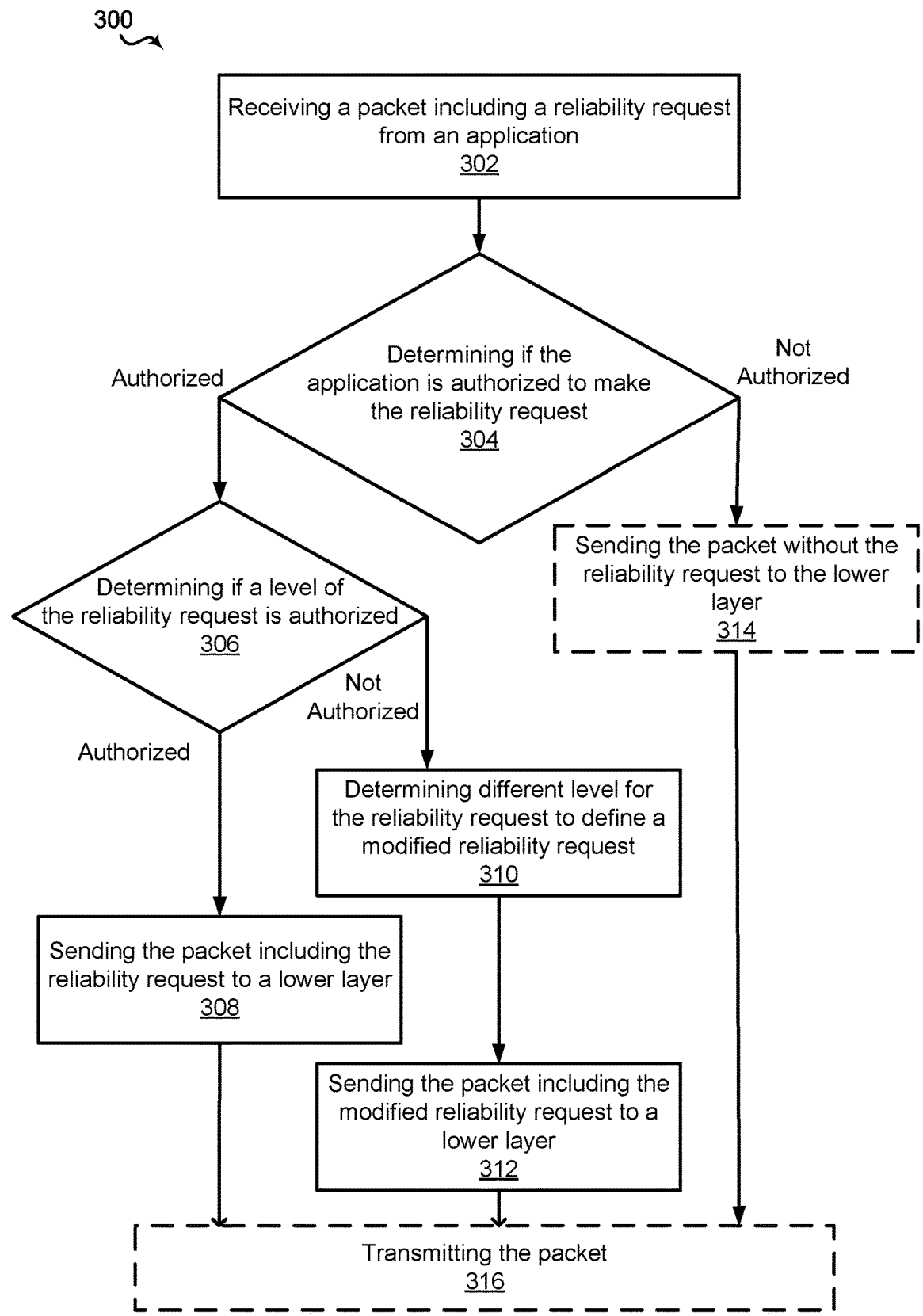
FIG. 3 is flowchart of an example method for transmission control at a user equipment.

Referring to FIG. 3, one example of a method 300 of a policy-based transmission control is operable by the UE 110 to determine whether an application, e.g., a V2X application, is authorized to make a reliability request associated with a data packet sent for transmission.

At block 302, the method 300 may include receiving a data packet including a reliability request from an application. For example, the modem 140 and/or the communication component 150 may receive data packet 146 (FIG. 1) including reliability request 144 (FIG. 1) from an application 220 or 222 (FIG. 2), such as a V2X application. The reliability request 144 may be associated with one or more requested transmission reliability features, such as but not limited to, a duplication request, a transmission diversity request, or a carrier aggregation request.

At block 304, the method 300 may including determining if the application is authorized to make the reliability request. For example, communication component 150 and/or the transmission reliability authorization component 152 may determine if the application, e.g., application 220 or 222, is authorized to make the reliability request 144. For instance, in an implementation, the transmission reliability authorization component 152 may examine one or more sets of authorization information 217, such as a look-up table, contained in policy 215, to determine whether the application is authorized. The look-up table may include a list of authorized provider service identifiers (PSIDs), and/or a list of not authorized PSIDs. Alternatively, the policy 215 and/or authorization information 217 may include a list of authorized applications (a "white list") to make a reliability request. Applications not on the white list may be forbidden to make a reliability request. The table may also include a list of unauthorized applications (a "black list"). In this case, applications not on the black list may be permitted to make a reliability request. Other implementations may also be used to identify applications authorized and/or unauthorized to make reliability requests for transmissions by the UE 110.

Still referring to block 304 of FIG. 3, when determining whether the application is authorized, in some examples, the communication component 150 and/or the transmission reliability authorization component 152 may identify a provider service identifier associated with the requesting application. The communication component 150 and/or the transmission reliability authorization component 152 may compare the provider service identifier with the list of provider service identifiers in the table to identify the authorization status of the requesting application.

Method 300 may perform different actions in further processing the data packet depending on whether the application is or is not authorized, and/or depending on an authorized level of reliability that may be requested by the application. For example, the authorization information 217 may further include an authorized reliability level, e.g., one of a plurality of values (e.g., PPPR0 versus PPPR3), associated with each authorized provider service identifier or application.

At block 306, if determined at block 304 that the application is authorized to make a reliability request, the method 300 may further include determining if the level of the reliability request is authorized. For example, the communication component 150 and/or the transmission reliability authorization component 152 may determine if the level of the reliability request, e.g., PPPR3, is authorized. If the level of the reliability request is higher than the protocol level, then the reliability request may be authorized. As mentioned above, for instance, the communication component 150 and/or the transmission reliability authorization component 152 may compare an authorized reliability level associated with the authorized provider service identifier in the authorization information 217 to identify whether the requested level is authorized.

At block 308, the method 300 may send the packet including the reliability request to a lower protocol layer in response to determining the application is authorized to make the reliability request, and the level of requested reliability is also authorized. For example, the communication component 150 and/or the transmission reliability authorization component 152 may send the packet, along with the original reliability request to a lower layer, such as the V2X AS layer 206, the MAC layer 208, and/or the PHY layer 210. The communication component 150 may send the packet transmitted via a bus, for example. The reliability request embedded in the corresponding PDU with the packet may provide instructions to the lower layer prior to transmitting the packet.

Alternatively, at block 310, the method 300 may include determining a different level of reliability, corresponding to an authorized level, and changing the reliability request to include the different level of reliability, thereby generating a modified reliability request. For example, the communication component 154 and/or the transmission reliability authorization component 152 may generate the modified reliability request and associated it with the packet. In a non-limiting example, the transmission reliability authorization component 152 may raise the reliability level of the reliability request (e.g., from 2 to 3).

Corresponding to block 310, at block 312, the method 300 may include sending the packet including the modified reliability request to the lower layer. For example, the communication component 150 and/or the transmission reliability authorization component 152 may send the packet, along with the modified reliability request including the different level of requested reliability (e.g., relative to the originally-requested level of reliability) to the lower layer. The communication component 150 may send the packet transmitted via a bus, for example.

Also, in the alternative where at block 304 it is determined that the application is not authorized to make a reliability request, the method 300 at block 314 may further include optionally sending the packet without the reliability request to the lower layer. For example, the communication component 150 and/or the transmission reliability authorization component 152 may optionally send the packet without the original reliability request, and without any reliability request, to the lower layer if the application is not authorized to make the reliability request based on the authorization information 217 in policy 215.

Optionally, at block 316, the method 300 may transmit the packet according to the received reliability request (e.g., original or modified), if any. For example, the modem 140 and/or the communication component 150 of the UE 110 may send the packet to a transceiver and/or other transmission components of the UE 110 for over-the-air transmission of a PDU containing the data packet. The transmission may be according to one or more transmission features 233, such as but not limited to packet duplication, transmission diversity, or carrier aggregation, based on the received reliability request. Additionally, in some cases, the transmission may be further configured based on priority information, e.g., PPPP, associated with the packet.

In some implementations, the method 300 may be implemented by a computer readable medium having instructions executed by a processor.

Figure 4:
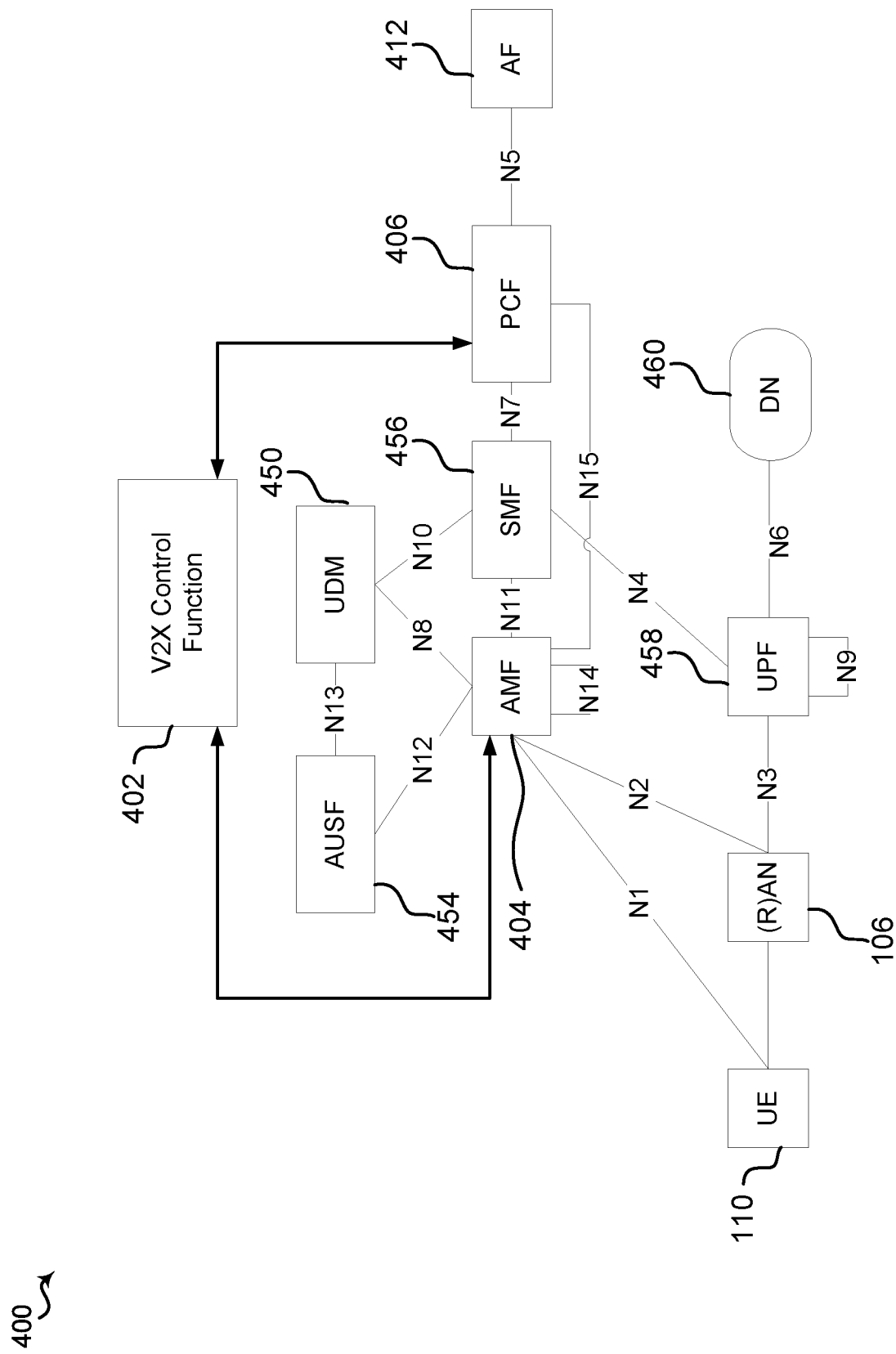
FIG. 4 is a schematic diagram of an example of a portion of a core network having components for configuring a user equipment.
Figure 5:
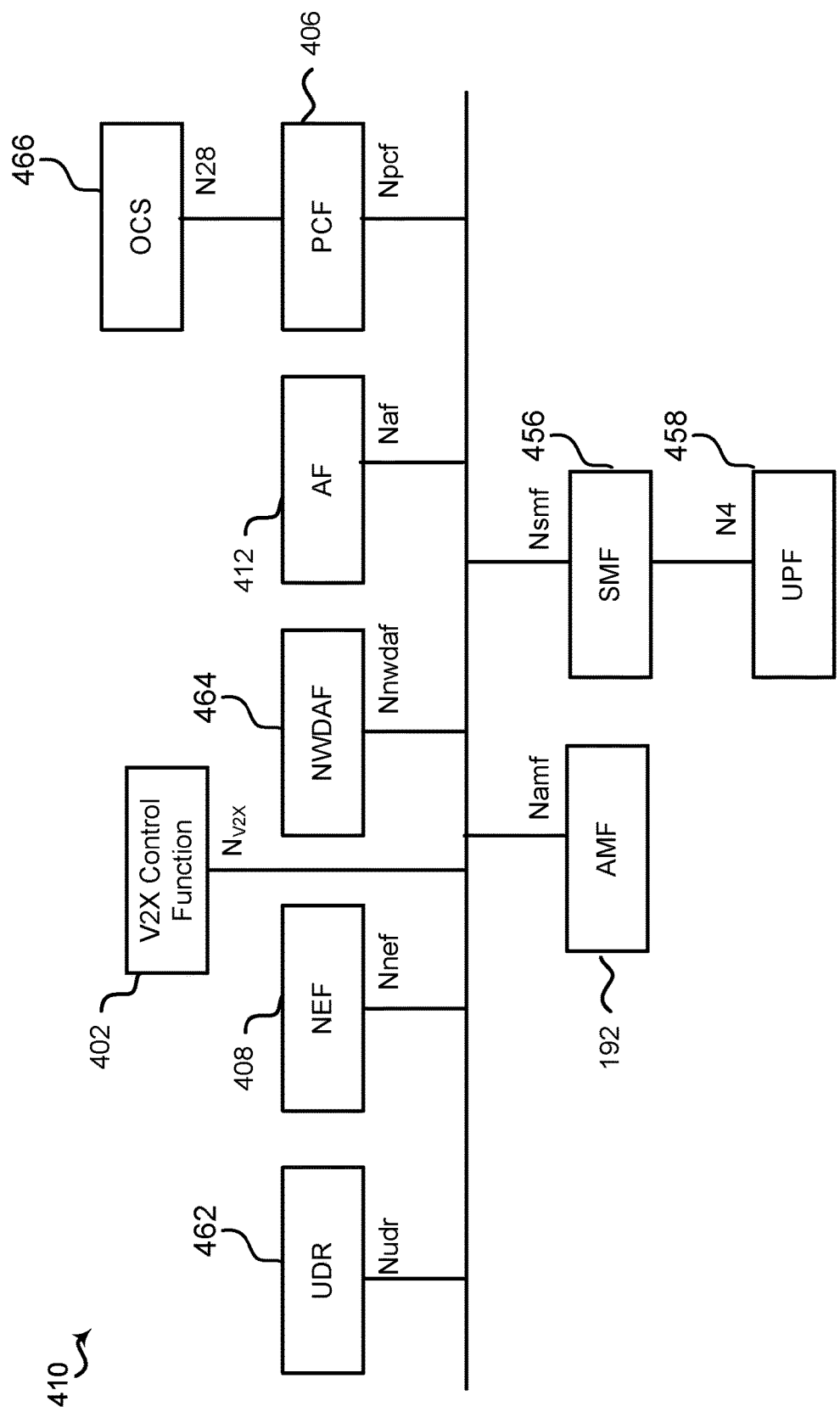
FIG. 5 is a schematic diagram of an example of a portion of a core network having components for configuring a user equipment.
Figure 6:
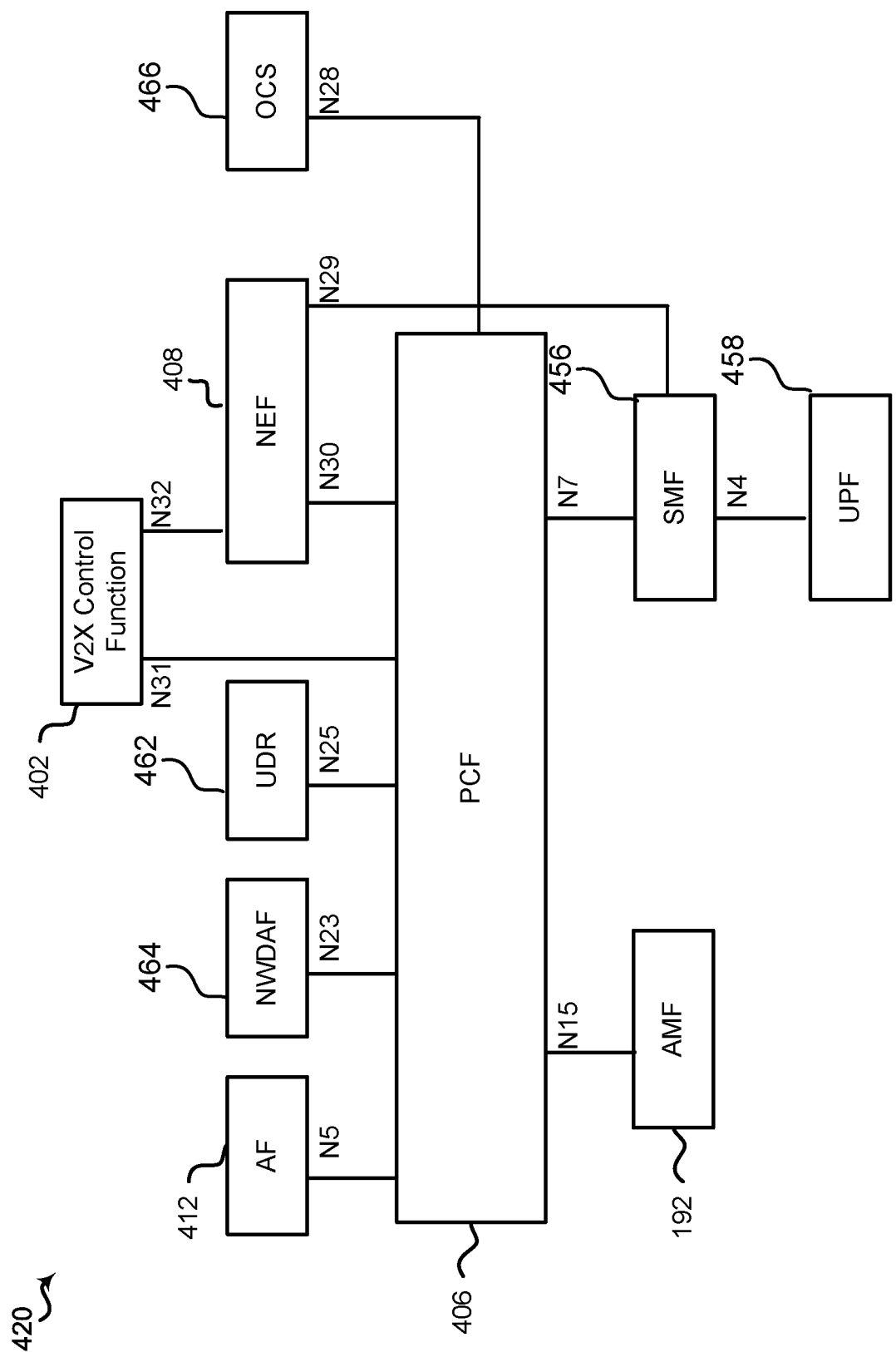
FIG. 6 is a schematic diagram of an example of a portion of a core network having components for configuring a user equipment.

Referring to FIGS. 4-6, core network configurations 400, 410, and 420 are examples of a core network environment, including various services and functional components, that may be used in generating a UE configuration (including policies 215) that may be provisioned on the UE 110, such as via control plane delivery from core network 115 to UE 110 via the BS 105.

As mentioned above, in certain implementations, the configuration (including policy 142 or 215) of the UE 110 may be provisioned via one or more control plane delivery mechanisms. For instance, the core network 115 may include a V2X control function 402, which can use one or more core network functions 170 (FIG. 1), such as an access and mobility management function (AMF) 404 or a policy control function (PCF) 406 to deliver the configurations. Both may be performed via the control plane and non-access stratum (NAS).

For example, in one optional implementation, the V2X control function 402 may be a service function interacting with UE 110 passing through the AMF 404, just like short message service function (SMSF) for short message service (SMS) or location management function LMF for location service (LCS), or PCF 406. In one case, the V2X control function 402 may be selected by the AMF 404 during registration. For example, when the UE 110 indicates V2X slice during registration, the AMF selects a V2X control function to serve the UE 110 according to the slice information, and the V2X control function 402 can be triggered to deliver the corresponding configuration to UE 110 via the AMF 404. Such configuration information can be delivered by the AMF transparently, i.e. AMF may use a NAS TRANSPORT container for such configuration information without understanding the details. In an alternative case, the UE 110 may request a configuration after registration, i.e. by sending a NAS message to the AMF 404, where the request indicates a routing target as the V2X control function 402.

This routing target could be indicated as part of the NAS message content type, a Destination Network Name (DNN), or a special predefined routing name. In some implementations, the core network configuration 400 may include the unified data management (UDM) 450 that may support the generations of authentication and key agreement (AKA) credentials, user identification handling, access authorization, and subscription management. The UDM 450 may communicate with other functions within the core network configuration 400 via a number of interfaces (e.g., N8, N10, and N13). The core network configuration 400 may include an application function (AF) 412 that may support application influence on traffic routing and interaction with policy framework for policy control. The AF 412 may communicate with other functions within the core network configuration 400 via a N5 interface.

In other implementations, the core network configuration 400 may include an authentication server function (AUSF) 454 that may serve as an authentication server. The AUSF 454 may communicate with other functions within the core network configuration 400 via a number of interfaces, such as the N12 or N13 interfaces. The core network configuration 400 may include a session management function (SMF) 456 that may support session management (session establishment, modification, release), UE internet protocol (IP) address allocation & management, dynamic host configuration protocol functions, termination of NAS signaling related to session management, downlink data notification, traffic steering configuration for UPF for proper traffic routing. The core network configuration 400 may include a user plane function (UPF) 458 that may support packet routing & forwarding, packet inspection, quality of service (QoS) handling, act as the external PDU session interface to the data network (DN) 522, and is an anchor point for both intra radio access technology (RAT) and inter-RAT mobility.

The RAN 106 may be a network entity residing between the core network 115 and the UE 110. The RAN 106 may be implemented, for example, by the base station 105. The RAN 106 may relay data between the core network 115 and the UE 110.

A data network (DN) 460 may provide data (e.g., multimedia) to the UPF 458.

Further, for example in another optional implementation, the V2X control function 402 may provision the configuration to the UE 110 as part of the Policy Framework operation, via the PCF 406. The PCF 406 delivers the configuration to the UE 110 as part of the UE policy (e.g., similar as UE route selection policies (URSP) and Access Network Discovery & Selection Policy (ANDSP)). During the delivery, the PCF 406 may also consider the slice information of the UE 110 or the subscription information of the UE. Further, in some cases, the V2X control function 402 may access the PCF 406 via a network exposure function (NEF) 408 (see FIGS. 5 and 6).

In some examples, referring to FIGS. 5 and 6, the PCF 406 may be used via the policy and charging control (PCC) framework. The AF 412 may make use of the Npcf and/or N5 logical interfaces to interact with the PCF 406. Alternatively, the AF 412 may access the PCF 406 via the NEF 408 using a Nnef logical interface. In certain implementations, the V2X control function 402 may be viewed as a type of AF 412 that is able to use the PCF framework. Alternatively, the V2X control function 402 may have a Nv2x interface defined that allows PCF or NEF to interact with it. For example, the V2X control function 402 may communicate with the AMF 404 via the Nv2x and Namf interfaces, and with the PCF 406 via the Nv2x and Npcf interfaces. In other implementations, the V2X control function 402 may communicate with the PCF 406 directly using the N31 point-to-point interface, or through the NEF 408 using the N30 and N31 interfaces.

In summary, as an example, during the registration of the UE 110, AMF 404 may select a V2X control function 402 for provisioning the configuration. The V2X control function 402 may be triggered to deliver the configuration to the UE 110 via the AMF 404. Once the AMF 404 receives the configuration, the AMF 404 transmits the configuration to the UE 110 to configure the policies. In other examples, the UE 110 may request the configuration information by sending a NAS message to the AMF 404, indicating the routing target as the V2X control function 402. Alternatively, the V2X control function 402 may deliver the configuration to the UE 110 via a PCF 406. The PCF 406 delivers the configuration to the UE 110 as part of the UE policy. In certain examples, according to this disclosed arrangement, the UE 110 may reliably obtain the configuration via the control plane instead of the user plane. In certain examples, the V2X control function 402 may decide to update the configuration (including the policies 144, 215) of the UEs 110 via the AMF 404, PCF 406, or NEF 408. In order to locate the proper AMF, PCF, or NEF instance to communicate with the UE 110, the V2X control function 402 may query the UDM 450 using the UE's identifier. Such identifier includes, but not limited to, IMSI, MS ISDN, Subscription Permanent Identifier (SUPI), Subscription Concealed Identifier (SUCI), or other identifier used for V2X services. In some examples of the operation, the configuration information provided by the V2X control function 402 includes further control parameters of the V2X operation, e.g. the authorization policy regarding the UE's 110 V2X operation when served by NG-RAN, LTE or not served by NG-RAN or LTE, radio parameters for when not served by NG-RAN or LTE, mapping of Destination L2 ID and the PSID, mapping of PPPP and packet delay budget, or the configuration regarding UE's 110 V2X operation over Uu link. A unified data repository (UDR) 462 may be a converged repository of subscriber information. In some examples, other functions, such as the UDM 450, may utilize the UDR 462 to store and/or retrieve subscription data. A network data analytic function (NWDAF) 464 may centralize data collection and analytics. An online charging system (OCS) 466 may manage accounts of subscribers.

Figure 7:
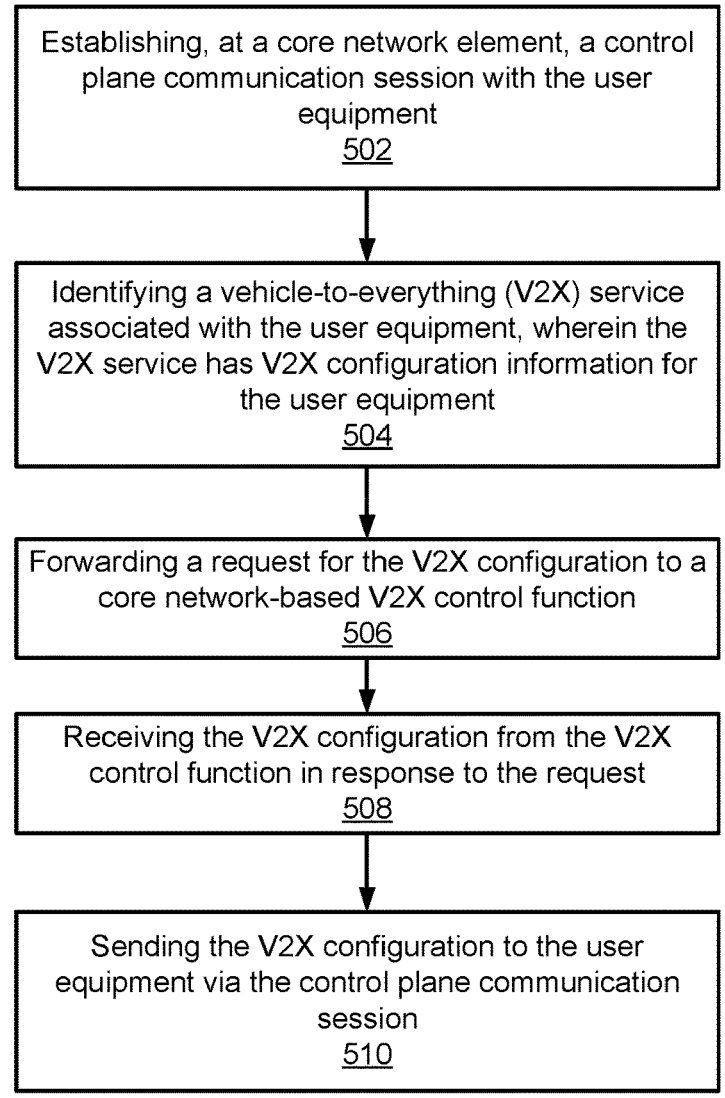
FIG. 7 is a flowchart of an example of a method for configuring a user equipment by a core network.

Referring to FIG. 7, an example method 500 may be executed by one or more components of a core network for provisioning a configuration to the UE 110. The V2X control function 402 may utilize the AMF 404, the PCF 406 to deliver the configuration information to the UE 110. In a non-limiting example, the V2X control function 402 may be selected by the AMF 404 during registration, and may deliver the configuration to the UE 110 via the AMF 404. Alternatively, the V2x control function 402 may provision the configuration to the UE 110 as part of the policy framework, and the PCF 406 delivers the configuration to the UE 110 via the one or more core network functions 170.

At block 502, the method 500 may include establishing, at a core network element, a control plane communication session with the user equipment. For example, in an implementation, one or more core network functions 170 may establish a control plane communication session with the UE 110 via BS 105. In a non-limiting example, the AFM 404 may establish a communication session with the UE 110. Alternatively, the PCF 406 may establish a session with the UE 110 via the one or more core network functions 170.

At block 504, the method 500 may include identifying a vehicle-to-everything (V2X) service associated with the user equipment, wherein the V2X service has V2X configuration information for the user equipment.

In some implementations, the actions of block 504 may include receiving, at a core network-based access and mobility management function (AMF) 404, a registration request from the UE 110 and identifying, by the AMF 404, a V2X slice for the UE 110 based on the registration request. In this case, identifying the V2X service associated with the UE 110 includes identifying by the AMF 404 based on the V2X slice identified based on the registration request.

In other implementations, the actions of block 504 may include receiving, at a core network-based access and mobility management function (AMF) 404, a non-access stratum configuration request message from the UE 110, wherein the non-access stratum message includes a routing target indication corresponding to the V2X control function 402. In this case, identifying the V2X service associated with the UE 110 includes identifying by the AMF 404 based on the routing target indication corresponding to the V2X control function 402.

In further implementations, the actions of block 504 may include policy control function (PCF) 406 identifying the V2X service associated with the UE 110.

At block 506, the method 500 may include forwarding a request for the V2X configuration to a core network-based V2X control function. For example, one or more core network functions 170, such as the function that performs the above-noted identifying, e.g., one of the AMF 404 or PCF 406, may forward a request for the V2X configuration to the V2X control function 402.

At block 508, the method 500 may include receiving the V2X configuration from the V2X control function in response to the request. For example, the AMF 404 or PCF 406 may receive the V2X configuration from the V2X control function 402.

At block 510, the method 500 may include sending the V2X configuration to the user equipment via the control plane communication session. For example, the AMF 404 or PCF 406 may send the V2X configuration to the UE 110 in a control plane communication session via the BS 105.

In some implementations, the method 500 may be implemented by a computer readable medium having instructions executed by a processor.

Figure 8:
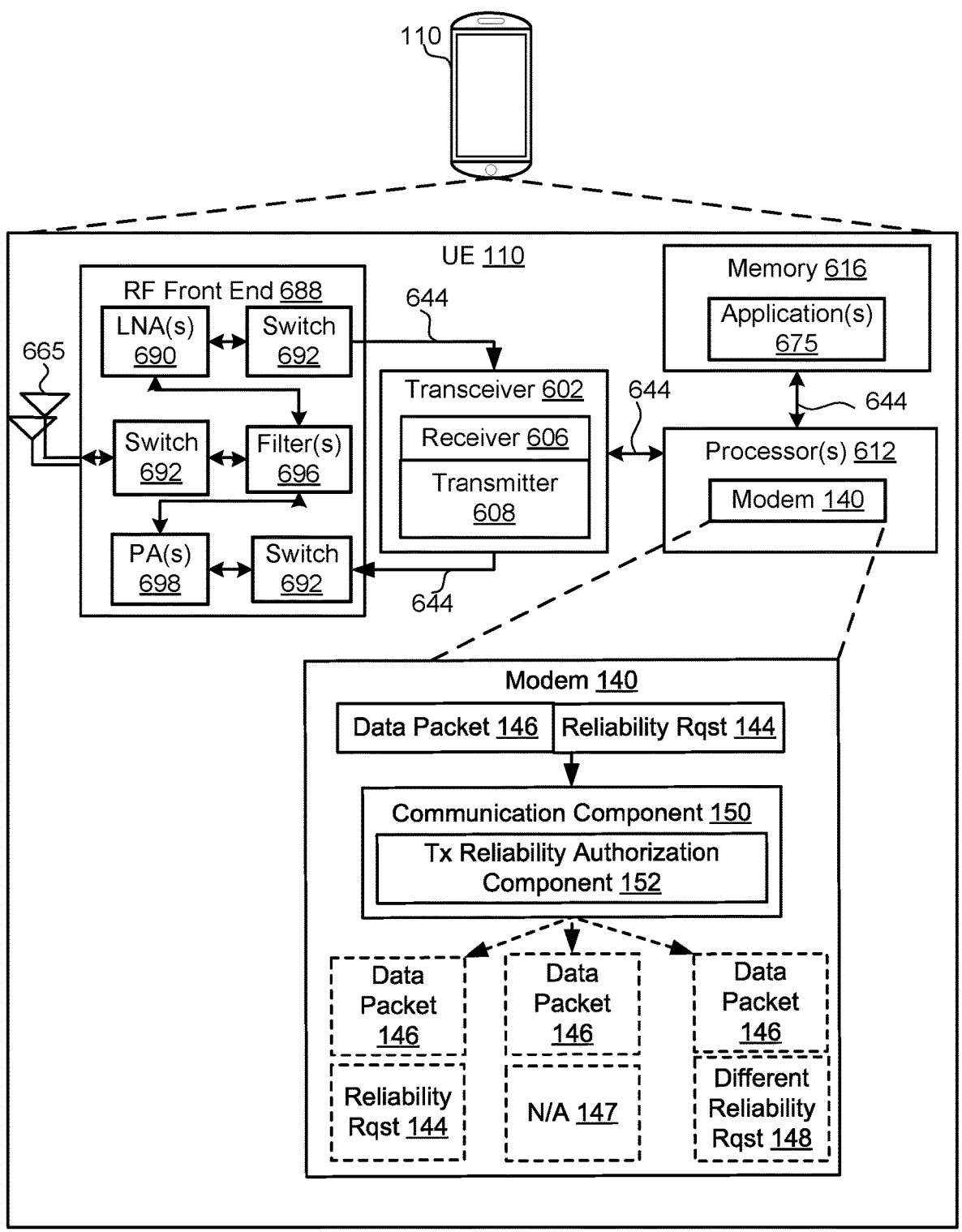
FIG. 8 is a schematic diagram of an example of a user equipment as described herein.

Referring to FIG. 8, one example of an implementation of the UE 110 may include a variety of components, some of which have already been described above, but including components such as one or more processors 612 and memory 616 executing one or more applications 675 (e.g., V2X applications similar to applications 220 or 222), and transceiver 602 in communication via one or more buses 644, which may operate in conjunction with modem 140 and the communication component 150 to enable one or more of the functions described herein related to controlling data packet transmission reliability. Further, the one or more processors 612, modem 140, memory 616, transceiver 602, RF front end 688 and the antenna system 665, may be configured to support voice and/or data calls (simultaneously or non-simultaneously) in one or more radio access technologies.

In an aspect, the one or more processors 612 can include a modem 140 that uses one or more modem processors. The various functions related to the communication component 150 may be included in modem 140 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 140 associated with the packet component 150 may be performed by transceiver 602.

Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining the communication component 150 and/or one or more of its subcomponents, and/or data associated therewith, when UE 110 is operating at least one processor 612 to execute the communication component 150 and/or one or more of its subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, the UE 110 may include RF front end 688, which may operate in communication with the antenna system 665 and transceiver 602 for receiving and transmitting radio transmissions, for example, wireless communications transmitted by at least one BS 105 or wireless transmissions transmitted by other BS 105 and UE 110. RF front end 688 may be connected to the antenna system 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by the transceiver 602 and/or processor 612.

As such, the transceiver 602 may be configured to transmit and receive wireless signals through the antenna system 665 via RF front end 688. In an aspect, transceiver may be tuned to operate at specified frequencies such that UE 110 can communicate with, for example, one or more BSs 105 or one or more cells associated with one or more base stations 105. In an aspect, for example, modem 140 can configure the transceiver 602 to operate at a specified frequency and power level based on the BS configuration of the UE 110 and the communication protocol used by modem 140.

In an aspect, modem 140 can be a multiband-multimode modem, which can process digital data and communicate with transceiver 602 such that the digital data is sent and received using transceiver 602. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on BS configuration information associated with UE 110 as provided by the network.

Figure 9:
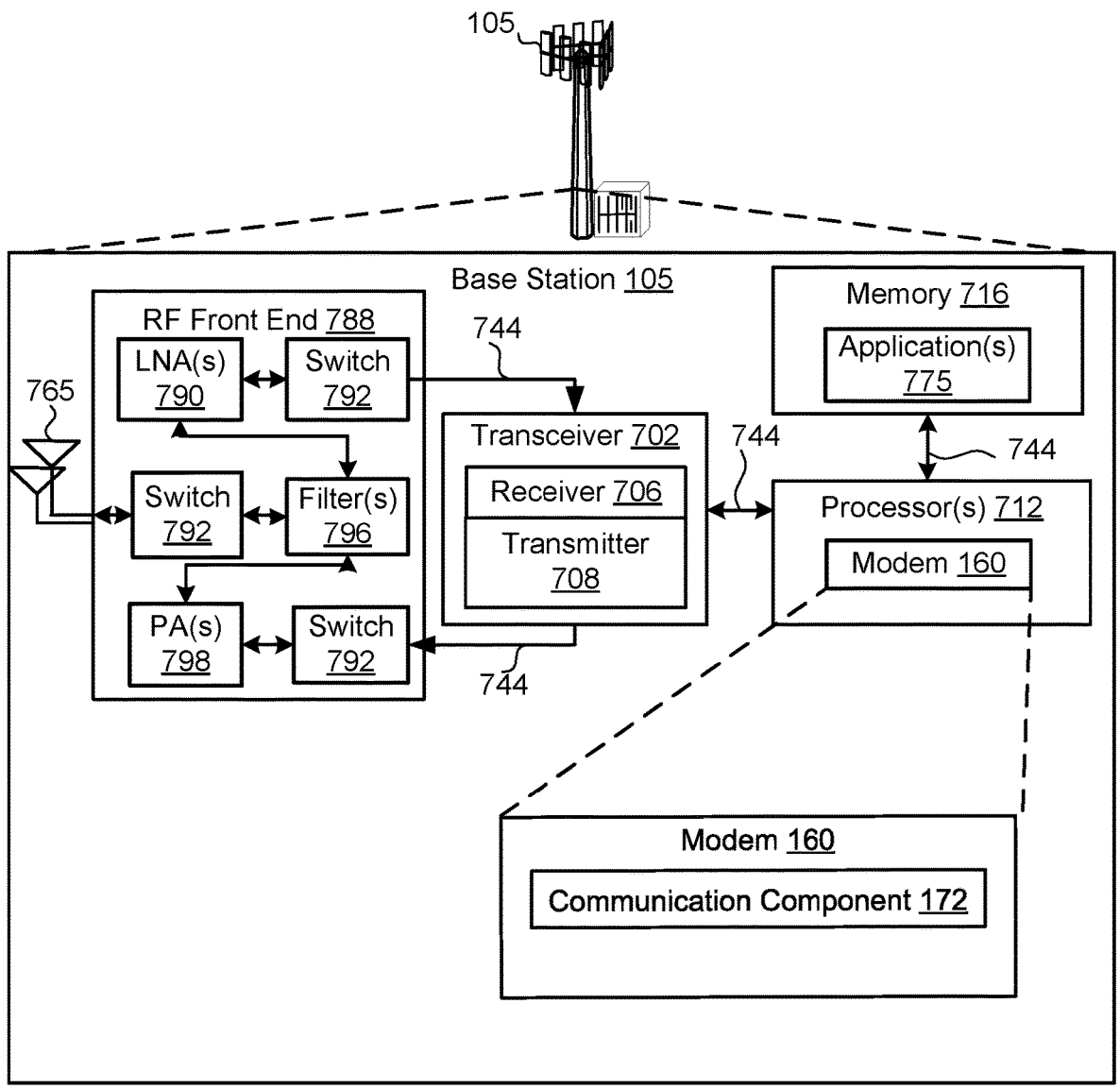
FIG. 9 is a schematic diagram of an example of a base station (BS) as described herein.

Referring to FIG. 9, one example of an implementation of the BS 105 may include a variety of components, some of which may be similar to the UE components already described above in connection with FIG. 8, but including components such as one or more processors 712 and memory 716, e.g., executing one or more applications 775, and transceiver 702 in communication via one or more buses 744, which may operate in conjunction with modem 160 and the communication component 172 to enable one or more of the functions described herein related to controlling data packet transmission reliability at the UE 110.

Figure 10:
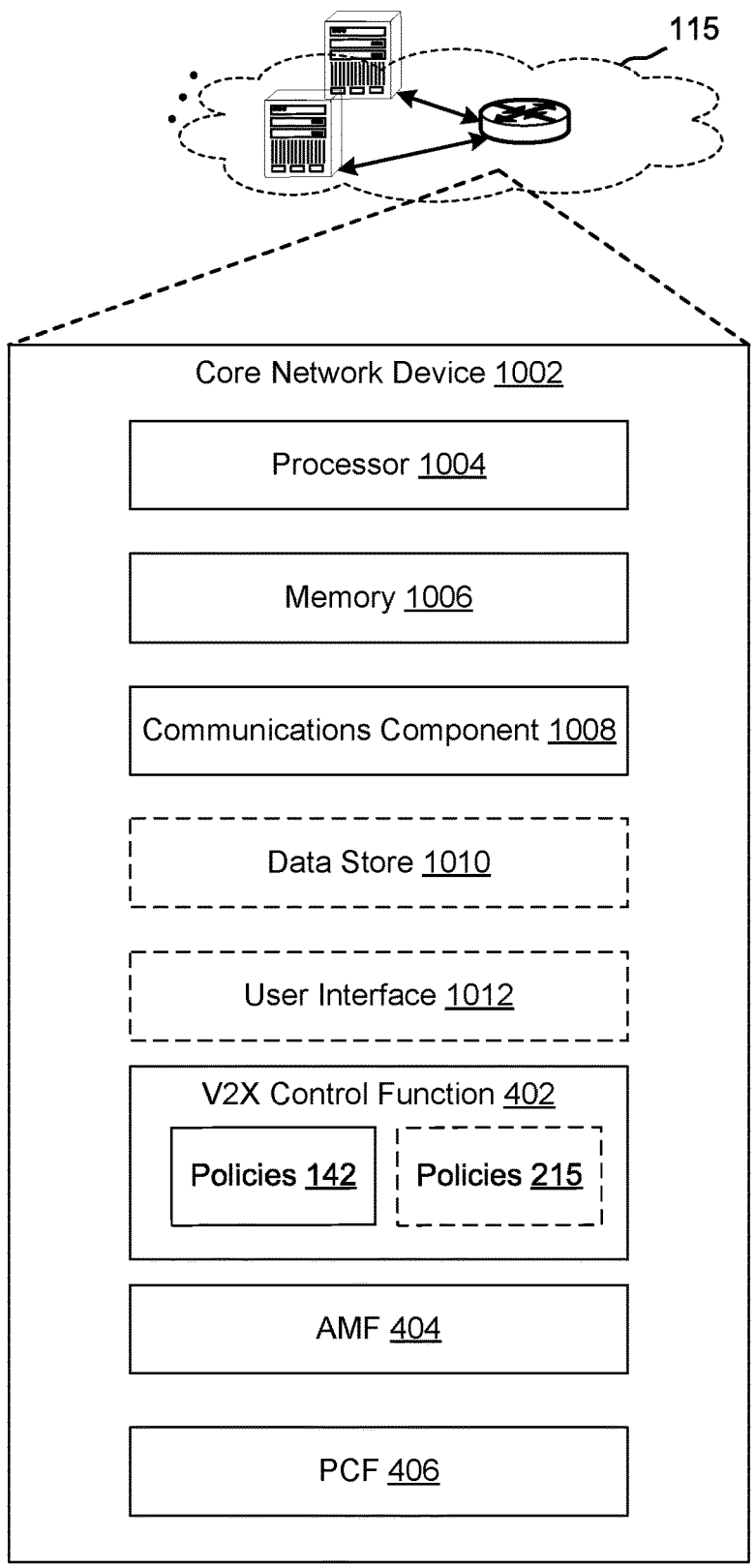
FIG. 10 is a schematic diagram of an example computer device implementing one or more core network functionalities described herein.

Referring to FIG. 10, in one aspect, the functionality described herein related to core network 115 (FIG. 1) may be implemented by one or more core network devices 1002, such as computer devices or servers, that may operate in communication with UE 110 to provide one or more control plane delivery mechanisms for provisioning the UE 110 with configurations and/or policies, such as policy 142 (FIG. 1) or policy 215 (FIG. 2). For example, device 1002 may include a processor 1004 for carrying out processing functions associated with one or more of components and functions described herein. Processor 1004 can include a single or multiple set of processors or multi-core processors. Moreover, processor 1004 can be implemented as an integrated processing system and/or a distributed processing system. In an aspect, for example, V2X control function 402, AMF 404, and/or PCF 406, for example, may be implemented as one or more a specially-programmed or configured processor modules of processor 1004, or processor 1004 may execute one or more computer-executable codes defining V2X control function 402, AMF 404, and/or PCF 406, or some combination thereof.

Device 1002 may further include a memory 1006, such as for storing data used herein and/or local versions of applications or V2X control function 402, AMF 404, and/or PCF 406, for example, being executed by processor 1004. Memory 1006 can include any type of computer-readable medium usable by a computer or processor 1004, such as random access memory (RAM), read only memory (ROM), tapes, magnetic discs, optical discs, volatile memory, non-volatile memory, and any combination thereof. In an aspect, for example, memory 1006 may be a computer-readable storage medium that stores one or more computer-executable codes defining V2X control function 402, AMF 404, and/or PCF 406, for example, and/or data associated therewith, when device 1002 is operating processor 1004 to execute V2X control function 402, AMF 404, and/or PCF 406, for example.

Also, device 1002 may further include a communications component 1008 that includes one or more buses that enable communication internally among components of device 1002, and that includes one or more interfaces that enable communication with external devices. As such, communications component 1008 is configured to establish and maintain communications with one or more entities utilizing hardware, software, and services as described herein. In an aspect, for example with respect to external communications, communications component 1008 may further include transmit chain components (e.g., protocol layer entities, processor(s), modulator(s), antenna) and receive chain components (e.g., protocol layer entities, processor(s), demodulator(s), antenna) associated with one or more transmitters and receivers, respectively, or one or more transceivers, operable for interfacing with external devices. In an aspect, for example, communications component 1008 may operate in cooperation with V2X control function 402, AMF 404, and/or PCF 406, for example, to exchange and/or generate the communications and/or signaling described herein.

Optionally, in an aspect, device 1002 may further include a data store 1010, which can be any suitable combination of hardware and/or software, that provides for mass storage of information, databases, and programs employed in connection with aspects described herein. For example, data store 1010 may be a computer-readable storage medium, such as a data repository, for computer-executable code and/or applications not currently being executed by processor 1004. In an aspect, for example, data store 1010 may store one or more computer-executable codes defining V2X control function 402, AMF 404, and/or PCF 406, for example, and/or data associated therewith, when device 1002 is not executing V2X control function 402, AMF 404, and/or PCF 406, for example.

In another optional implementation, device 1002 may additionally include a user interface component 1012 operable to receive inputs from a user of device 1002, and further operable to generate outputs for presentation to the user. User interface component 1012 may include but is not limited to one or more input devices, including but not limited to a keyboard, a number pad, a mouse, a touch-sensitive display, a navigation key, a function key, a microphone, a voice recognition component, a mechanism capable of receiving an input from a user, or any combination thereof. Further, user interface component 1012 may include but is not limited to one or more output devices, including but not limited to a display, a speaker, a haptic feedback mechanism, a printer, a mechanism capable of presenting an output to a user, or any combination thereof. In an aspect, for example, user interface component 1012 may operate in cooperation with V2X control function 402, AMF 404, and/or PCF 406, for example, to exchange and/or generate the communications and/or signaling described herein.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of transmission control at a user equipment, comprising:
   receiving, at a non-access stratum protocol layer, a packet including a reliability request from an application;
   determining, at the user equipment, if the application is authorized to make the reliability request;
   in response to determining the application is authorized to make the reliability request, performing one of:
   sending the packet including the reliability request to an access stratum protocol layer; or sending the packet with a modified reliability request to a second protocol layer; and
   transmitting the packet via a vehicle-to-everything (V2X) communication channel.

2. The method of claim 1, wherein the reliability request includes a ProSe Per Packet Reliability parameter having one of a plurality of values that each correspond to a different level of reliability and/or to a different type of transmission.

3. The method of claim 1, further comprising, in response to determining the application is authorized to make the reliability request:
   determining the reliability request indicates a packet duplication request;
   generating a duplicate packet of the packet; and
   transmitting the duplicate packet over different channels.

4. The method of claim 1, wherein determining the application is authorized further includes:

receiving a list of authorized provider service identifiers of authorized applications;
identifying a provider service identifier associated with the application; and
determining the list of the authorized provider service identifiers includes the provider service identifier associated with the application.

5. The method of claim 1, wherein determining the application is not authorized further includes:
receiving a list of unauthorized provider service identifiers of unauthorized applications;
identifying a provider service identifier associated with the application; and
determining the list of the unauthorized provider service identifiers includes the provider service identifier associated with the application.

6. The method of claim 1, further comprising, in response to determining the application is authorized to make the reliability request:
determining if a level of the reliability request is authorized;
wherein sending the packet to the second protocol layer comprises the sending of the packet with the reliability request to the second protocol layer in response to determining the level of the reliability request is authorized; and
in response to determining the level of the reliability request is not authorized:
determining a different level for which the application is authorized; and
wherein sending the packet to the second protocol layer comprises the sending of the packet with the modified reliability request having the different level to the second protocol layer.

7. The method of claim 1, wherein the reliability request indicates at least one of a packet duplication request, a transmission diversity request, or a carrier aggregation request.

8. The method of claim 1, further comprising, in response to determining the application is not authorized to make the reliability request, sending the packet without the reliability request to the second protocol layer.

9. A user equipment, comprising:
a memory; and
a processor in communication with the memory and configured to:
receive, at a non-access stratum protocol layer, a packet including a reliability request from an application;
determine, at the user equipment, if the application is authorized to make the reliability request;
in response to determining the application is authorized to make the reliability request, performing one of:
send the packet including the reliability request to an access stratum protocol layer; or send the packet with a modified reliability request to a second protocol layer; and
initiate transmission of the packet via a vehicle-to-everything (V2X) communication channel.

10. The user equipment of claim 9, wherein the reliability request includes a ProSe Per Packet Reliability parameter having one of a plurality of values that each correspond to a different level of reliability and/or to a different type of transmission.

11. The user equipment of claim 9, wherein the processor is further configured to, in response to determining the application is authorized to make the reliability request:
determine the reliability request indicates a packet duplication request;
generate a duplicate packet of the packet; and
initiate transmission of the duplicate packet over different channels.

12. The user equipment of claim 9, wherein determining the application is authorized further includes:
receiving a list of authorized provider service identifiers of authorized applications;
identifying a provider service identifier associated with the application; and
determining the list of the authorized provider service identifiers includes the provider service identifier associated with the application.

13. The user equipment of claim 9, wherein determining the application is not authorized further includes:
receiving a list of unauthorized provider service identifiers of unauthorized applications;
identifying a provider service identifier associated with the application; and
determining the list of the unauthorized provider service identifiers includes the provider service identifier associated with the application.

14. The user equipment of claim 9, wherein the processor is further configured to, in response to determining the application is authorized to make the reliability request:
determine if a level of the reliability request is authorized;
wherein sending the packet to the second protocol layer comprises the sending of the packet with the reliability request to the second protocol layer in response to determining the level of the reliability request is authorized; and
in response to determining the level of the reliability request is not authorized:
determining a different level for which the application is authorized; and
wherein sending the packet to the second protocol layer comprises the sending of the packet with the modified reliability request having the different level to the second protocol layer.

15. The user equipment of claim 9, wherein the reliability request indicates at least one of a packet duplication request, a transmission diversity request, or a carrier aggregation request.

16. The user equipment of claim 9, wherein the processor is further configured to, in response to determining the application is not authorized to make the reliability request, send the packet without the reliability request to the second protocol layer.

17. A method of configuring a user equipment, comprising:
establishing, at a core network element, a control plane communication session with the user equipment;
identifying a vehicle-to-everything (V2X) service associated with the user equipment, wherein the V2X service has V2X configuration information for the user equipment;
forwarding a request for the V2X configuration information to a core network-based V2X control function;
receiving the V2X configuration information from the V2X control function in response to the request, wherein the V2X configuration information authorizes the user equipment to:
determine, at a non-access stratum protocol layer associated with the user equipment, whether an application is authorized to make a reliability request via a packet, and send the packet including the reliability request to an access stratum protocol layer associated with the user equipment, or send the packet including a modified reliability request to a second protocol layer; and transmitting the V2X configuration information to the user equipment via the control plane communication session.

18. The method of claim 17, further comprising:
receiving, at a core network-based access and mobility management function (AMF), a registration request from the user equipment; and
identifying, by the AMF, a V2X slice for the user equipment based on the registration request;
wherein identifying the V2X service associated with the user equipment comprises identifying by the AMF based on the V2X slice identified based on the registration request.

19. The method of claim 18, further comprising identifying the V2X control function based on information associated with the V2X slice.

20. The method of claim 17, further comprising:
receiving, at a core network-based access and mobility management function (AMF), a non-access stratum configuration request message from the user equipment, wherein the non-access stratum message includes a routing target indication corresponding to the V2X control function; and
wherein identifying the V2X service associated with the user equipment comprises identifying by the AMF based on the routing target indication corresponding to the V2X control function.

21. The method of claim 17, wherein identifying the V2X service associated with the user equipment comprises identifying a core network-based policy control function (PCF) based on a capability of the PCF to provide the V2X configuration information.

22. The method of claim 21, wherein the PCF communicates with the V2X control function, directly or via a network exposure function, to provide to the user equipment the V2X configuration information.

23. The method of claim 21, further comprising the V2X control function querying a unified data management to identify a core network-based access and mobility management function, a policy control function, or a network exposure function for providing the V2X configuration information to the user equipment.

24. A base station, comprising:
a memory; and
a processor in communication with the memory and configured to:
establish a control plane communication session with a user equipment (UE);
identify a vehicle-to-everything (V2X) service associated with the user equipment, wherein the V2X service has V2X configuration information for the user equipment;
forward a request for the V2X configuration information to a core network-based V2X control function;
receive the V2X configuration information from the V2X control function in response to the request, wherein the V2X configuration information authorizes the UE to:
determine, at a non-access stratum protocol layer associated with the UE, whether an application is authorized to make a reliability request via a packet, and
send the packet including the reliability request to an access stratum protocol layer associated with the UE, or
send the packet including a modified reliability request to a second protocol layer; and
transmit the V2X configuration information to the user equipment via the control plane communication session.

25. The base station of claim 24, wherein the processor is further configured to:
receive, at a core network-based access and mobility management function (AMF), a registration request from the user equipment; and
identify, by the AMF, a V2X slice for the user equipment based on the registration request;
wherein identifying the V2X service associated with the user equipment comprises identifying by the AMF based on the V2X slice identified based on the registration request.

26. The base station of claim 25, wherein the processor is further configured to identify the V2X control function based on information associated with the V2X slice.

27. The base station of claim 24, wherein the processor is further configured to:
receive, at a core network-based access and mobility management function (AMF), a non-access stratum configuration request message from the user equipment, wherein the non-access stratum message includes a routing target indication corresponding to the V2X control function; and
wherein identifying the V2X service associated with the user equipment comprises identifying by the AMF based on the routing target indication corresponding to the V2X control function.

28. The base station of claim 24, wherein identifying the V2X service associated with the user equipment comprises identifying a core network-based policy control function (PCF) based on a capability of the PCF to provide the V2X configuration information.

29. The base station of claim 28, wherein the PCF communicates with the V2X control function, directly or via a network exposure function, to provide to the user equipment the V2X configuration information.

30. The base station of claim 24, further comprising the V2X control function querying a unified data management to identify a core network-based access and mobility management function, a policy control function, or a network exposure function for providing the V2X configuration information to the user equipment.

* * * * *